(12) United States Patent
Santiago et al.

(10) Patent No.: US 10,452,188 B2
(45) Date of Patent: Oct. 22, 2019

(54) PREDICTIVE COMPENSATION FOR A LATENCY OF AN INPUT DEVICE

(75) Inventors: Pravin K. Santiago, Issaquah, WA (US); Masahiko Kaneko, Fall City, WA (US); Nikola Letié, Redmond, WA (US); Thomas W. Olsen, Sammamish, WA (US); Ruoyang Li, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 684 days.

(21) Appl. No.: 13/350,588

(22) Filed: Jan. 13, 2012

(65) Prior Publication Data

US 2013/0181908 A1    Jul. 18, 2013

(51) Int. Cl.
*G06F 3/041* (2006.01)
*G06F 3/0488* (2013.01)

(52) U.S. Cl.
CPC .......... *G06F 3/0416* (2013.01); *G06F 3/0488* (2013.01)

(58) Field of Classification Search
CPC ........ G06F 3/041; G06F 3/017; G06F 3/0416; G06F 3/0488
USPC .......................................... 345/173
See application file for complete search history.

(56) References Cited

U.S. PATENT DOCUMENTS

| | | | |
|---|---|---|---|
| 4,277,783 A * | 7/1981 | Sampieri et al. | 345/182 |
| 6,101,228 A * | 8/2000 | Hebron | H04B 1/1036 370/335 |
| 6,888,536 B2 * | 5/2005 | Westerman | G06F 3/0235 345/156 |
| 7,289,906 B2 * | 10/2007 | van der Merwe | G01S 19/49 342/357.65 |
| 7,746,325 B2 * | 6/2010 | Roberts | 345/173 |
| 2002/0158920 A1 * | 10/2002 | Abrams | G06F 3/04812 715/856 |
| 2003/0217873 A1 * | 11/2003 | Paradiso et al. | 178/18.04 |
| 2004/0181370 A1 * | 9/2004 | Froehlich | G06F 9/5083 702/187 |
| 2005/0146512 A1 * | 7/2005 | Hill et al. | 345/173 |
| 2007/0156723 A1 | 7/2007 | Vaananen | |
| 2008/0048997 A1 * | 2/2008 | Gillespie | G06F 3/03547 345/174 |

(Continued)

OTHER PUBLICATIONS

"MAX11871", Retrieved on: Sep. 29, 2011, Available at: http://www.maxim-ic.com/datasheet/index.mvp/id/7203.

(Continued)

*Primary Examiner* — Andrew Sasinowski

(57) ABSTRACT

A computer configured to selectively use prediction to compensate for a latency of an input device. The input device may be a touch screen. Processing of touch inputs may lead to a latency between the user performing a touch input and the touch screen display responding to the touch input. A touch screen component predicts a subsequent position of a touch contact point based on the sensed positions of the touch contact point. The component may be a software component that provides a predictive output that can be selectively used based on a characteristic of a touch input. The component may be generic such that it may be applied on multiple types of computers equipped with different types of touch sensing hardware configured with any suitable settings. The component's output may be used to control the touch screen display.

20 Claims, 8 Drawing Sheets

(56) References Cited

U.S. PATENT DOCUMENTS

| | | | |
|---|---|---|---|
| 2009/0002333 A1* | 1/2009 | Maxwell et al. | 345/173 |
| 2009/0100383 A1* | 4/2009 | Sunday | G06F 3/04883 |
| | | | 715/863 |
| 2009/0143079 A1* | 6/2009 | Klassen | G01C 21/20 |
| | | | 455/456.3 |
| 2009/0267914 A1* | 10/2009 | Dews et al. | 345/173 |
| 2009/0322496 A1 | 12/2009 | Da Costa | |
| 2010/0073318 A1* | 3/2010 | Hu et al. | 345/174 |
| 2010/0079382 A1 | 4/2010 | Suggs | |
| 2010/0097352 A1* | 4/2010 | Ahn | G06F 3/0412 |
| | | | 345/175 |
| 2010/0149115 A1 | 6/2010 | Park et al. | |
| 2010/0151946 A1* | 6/2010 | Wilson et al. | 463/36 |
| 2010/0156656 A1 | 6/2010 | Duarte et al. | |
| 2010/0199231 A1* | 8/2010 | Markovic | H04N 7/18 |
| | | | 715/863 |
| 2010/0257478 A1* | 10/2010 | Longe et al. | 715/773 |
| 2010/0302175 A1* | 12/2010 | Fratti | 345/173 |
| 2010/0315337 A1* | 12/2010 | Ferren | G06F 1/169 |
| | | | 345/158 |

OTHER PUBLICATIONS

"MIDI Touch", Retrieved on: Sep. 29, 2011, Available at: http://itunes.apple.com/us/app/midi-touch/id398930935?mt=8.

"Archos 7 Home Tablet Review", Published on: Nov. 3, 2010, Available at: http://www.reviewboard.com/11/4208/archos-7-home-tablet-review.

\* cited by examiner

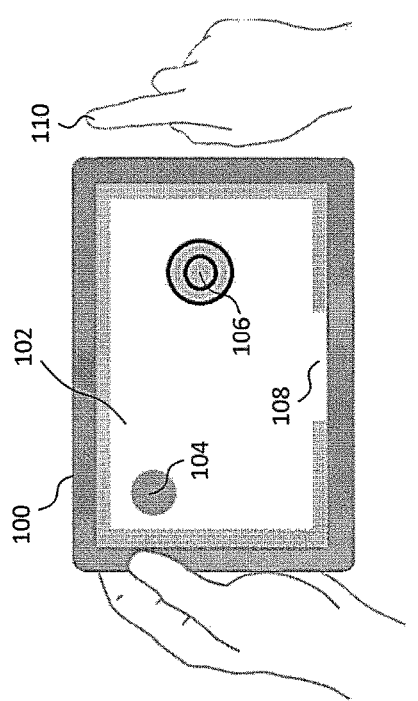
FIG. 1A
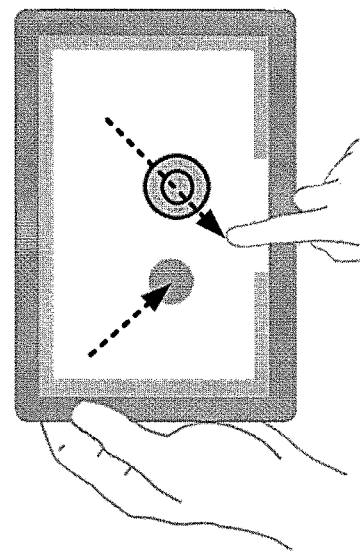
FIG. 1C
FIG. 1B
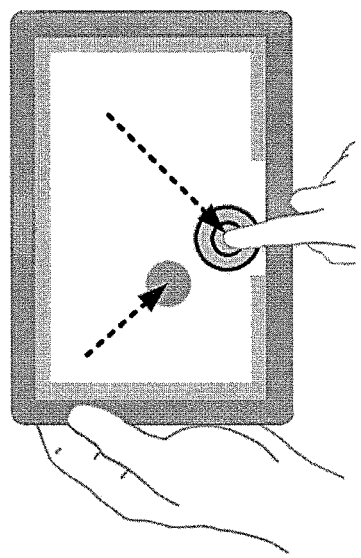
FIG. 1D

PREDICTIVE COMPENSATION FOR A LATENCY OF AN INPUT DEVICE

BACKGROUND

Many computers include one or more input devices. An input device may allow a user of the computer, such as a person or another computer, to provide information to the computer. An input device may be, for example, a keyboard, a mouse, a touch screen, a microphone, a digital camera, a network interface, a radio receiver, a Universal Serial Bus (USB) port, or any other device known in the art or suitable for providing information to a computer.

An input device may accept information provided in one or more modalities, such as an audible modality, a visible modality, or a tactile modality. For example, a microphone may accept audio input (in the form of, e.g., speech), while a keyboard may accept tactile input (in the form of, e.g., keystrokes). An input device may provide information to the computer in the same modality the information was received, or translate the information to another modality. For example, a microphone may accept audio input from a user and provide audio input to a computer. By contrast, a keyboard may accept tactile input from a user and provide text-based input to the computer.

Many computers include one or more output devices. An output device may allow a computer to provide information to a user of the computer. An output device may be, for example, a display screen, a speaker, a network interface, a radio transmitter, a USB port, or any other device known in the art our suitable for outputting information from a computer.

Many computing devices, including mobile devices such as tablets and smart phones, receive input through a "touch screen." A touch screen functions as an output device that displays content, such as content provided by an operating system or application executing on the computing device. A touch screen also functions as an input device that allows a user to provide inputs to the computing device by touching the screen. The inputs may represent commands to an operating system or an application. Some of the commands may provide content to be displayed, or may direct the computer to alter the display in some way. In this manner, a touch screen enables a user to interact with displayed content via touch.

Components associated with a touch screen may be configured to recognize different types of touches, which may be characterized by different patterns of contact with the touch screen. Different types of touches may be distinguished based on the number of simultaneous contact points, the trajectory of a motion associated with a contact point, and/or the duration of contact associated with a contact point.

Some touches may be characterized by contact instruments, such as fingers, maintaining multiple, simultaneous points of contact with the touch screen. For example, a "pinch" is a touch wherein, after two points of contact are established, a subsequent motion (such as movement of the fingers toward each other) decreases the distance between the contact points. A pinch may correspond to a command to reduce a magnification of the displayed content.

By contrast, some touches may be characterized by a finger maintaining a single point of contact with the touch screen. For example, a "tap" is a brief touch comprising an initial contact between the finger and the touch screen followed by loss of contact before a threshold time period has elapsed, without substantial intervening motion. A "press" is akin to a tap, but with contact of longer duration. A "swipe" is a touch comprising an initial contact between the finger and the touch screen and a subsequent motion of the contact point across the touch screen. A swipe may correspond to a command to pan the content displayed on the touch screen.

Multiple hardware, firmware, and software components may participate in the processing associated with the operation of a touch screen. For example, a touch sensing unit implemented in hardware or firmware may detect touch inputs, generate touch data describing the touch inputs, and transmit the touch data to low-level software controlled by the operating system, such as a touch screen driver. The low-level software may perform additional processing of the touch data, such as noise filtering, before passing the processed touch data to a higher-level software module, such as an application. Eventually, the touch data may be used by a display controller to alter the display of content on the touch screen.

The processing performed by components of a computing device may not be instantaneous. Rather, a period of time may elapse between initiation of the processing (e.g., provision of inputs to the component) and completion of the processing (e.g., provision of outputs by the component). This processing period may generally be referred to as a "latency" of the component or a "lag" associated with the component. Each component that participates in the processing associated with the operation of a touch screen may contribute to the touch screen's lag.

While a touch screen's lag may not always be perceivable to the touch screen's user, FIG. 1 illustrates a scenario in which the touch screen's lag is perceivable to a user who is manipulating the content displayed on the touch screen via touch. FIG. 1A illustrates a tablet computing device 100 equipped with a touch screen 102, which is displaying a table hockey game. The displayed portion of the table hockey game includes a puck 104, a bumper 106, and a goal 108. In FIG. 1B, the puck is moving toward the goal 108, and the user is touching the bumper 106 with the user's right index finger 110.

In FIG. 1C, the puck has moved closer to the goal and is continuing on a path toward the goal. The user is moving his finger along a path from the bumper's initial position to a position between the puck and the goal. This movement corresponds to a command to the table hockey game to move the bumper along the path traced by the user's finger. However, due to a lag associated with the touch screen, the position of the bumper is lagging behind the position of the user's finger. Thus, when the user's finger arrives at a point between the puck and the goal, the bumper is still moving toward that point. FIG. 1D illustrates the same movement of the user's finger on a touch screen with no perceivable lag.

As FIGS. 1A-1D illustrate, when touch is used to manipulate the position of an object displayed on a touch screen, the touch screen's lag may manifest itself as an undesired separation between the user's finger and the manipulated object. Though, a touch screen's lag may manifest itself in other ways or during other types of touches.

SUMMARY

Improved performance of a tablet computer may be provided through incorporation of touch prediction. Such prediction may be incorporated in software. Accordingly, the prediction may be selectively used based on a characteristic of a touch being performed. The prediction software may be generic such that it may be applied on multiple types of computers and applied to multiple types of touch sensing hardware. The software's generic applicability may be achieved in several ways. For example, the software may be suitable for incorporation into an operating system. Also, the software may receive or sense parameters of the hardware and/or parameters of operation. Accordingly, the prediction software may be configured for use with any suitable hardware and any suitable settings.

The inventors have recognized and appreciated that an improved user experience for a computer may be provided by using prediction to compensate for a latency associated with an input device, such as a touch screen. The touch screen may have a touch sensing unit. In some embodiments, the touch sensing unit may be a hardware component that detects touch inputs at a first time, generates touch data describing the touch inputs, and provides the touch data to a touch processing component at a second time. In some embodiments, the difference between the second time and the first time may be the latency of the touch sensing unit, and the touch data may include the sensed positions of touch contact points. The touch processing component of some embodiments may be a component of the operating system that interfaces with the touch sensing unit. Thus, in some embodiments the touch processing component may receive sensed positions of touch contact points that lag behind current positions of touch contact points, because the time at which the touch sensing unit detects the positions of the contact points lags behind the time at which the touch processing component receives the corresponding sensed positions.

In some embodiments the touch processing component may predict subsequent positions of a touch based on the sensed positions of the touch. Some embodiments of the touch processing component may select either the predicted positions or the sensed positions based on a characteristic of the touch, such as the touch's number of contact points, and provide an indication of the selection. For example, some embodiments of the touch processing component may select the predicted positions when the touch is a swipe. The touch processing component may provide the sensed positions, the predicted positions, and/or the selection indication to a software component, such as an application executing on the computing device. In some embodiments, the software component may selectively provide the sensed positions or the predicted positions to an output device controller, such as a display controller, based on the selection indication or on any other suitable criteria.

In some embodiments, predicting subsequent positions of a touch may comprise calculating prediction parameters based on characteristics of the touch sensing unit and/or on the sensed positions. Some embodiments may adapt the prediction parameters over time based on the sensed positions and/or the predicted positions, and may predict the subsequent positions of the touch based on the adapted parameters and the sensed positions. In some embodiments, calculating a predicted position of the touch may comprise calculating and smoothing predicted changes in the touch's position.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical element that is illustrated in various figures is represented by a like numeral. For purposes of clarity, not every element may be labeled in every drawing. In the drawings:

FIGS. 1A-1D are sketches of a user interacting with an exemplary embodiment of a touch screen computing device;

DETAILED DESCRIPTION

The inventors have recognized and appreciated that a touch screen's lag may impede the user's attempts to perform desired operations. Lag may therefore reduce a touch screen user's productivity or cause the touch screen user to become frustrated. Thus, techniques for reducing a touching screen's lag are needed.

Touch screen lag may be mitigated by redesigning the touch screen's components to reduce their latencies. However, low-latency touch screen components may yield poor noise rejection, because some of the components' latency is associated with filtering operations that improve noise rejection. That is, reducing the latency of a touch screen's components may increase the touch screen's sensitivity to spurious inputs.

Also, the components of a computing device may be provided by multiple upstream vendors and assembled by a downstream vendor. A touch screen's lag may be associated with components provided by different vendors. In such cases, designing the touch screen's components to reduce the touch screen lag may be logistically challenging.

Figure 2A:
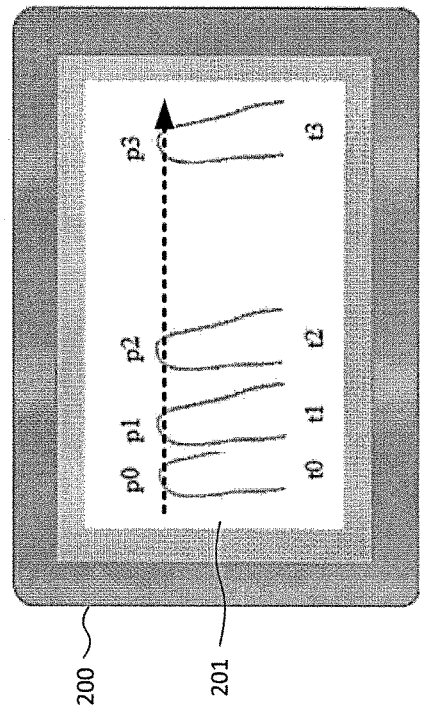
FIG. 2A is a sketch of a user interacting with an exemplary embodiment of a touch screen computing device at times t0, t1, t2, and t3.

Thus, practical techniques for reducing a touching screen's lag while providing acceptable noise rejection are needed. FIG. 2 illustrates how an embodiment of the invention may use prediction to compensate for latency associated with touch screen components. FIG. 2A is an illustration of a user interaction with a computing device 200 configured to operate an embodiment of the invention. In some embodiments, the computing device 200 may be a smart phone, tablet, slate, or other mobile device. Though, embodiments of the invention are not limited to operation on mobile devices. The computing device 200 is equipped with a touch screen 201.

In the example of FIG. 2A, a user's finger is in continuous contact with the touch screen 201 and is sliding from a left side of the touch screen 201 to a right side of the touch screen 201. The positions p0-p3 of the user's finger are illustrated at successive sample times t0-t3, respectively. In the embodiment of FIG. 2A, a sample time may be a time at which a touch sensing unit of the touch screen samples the characteristics of any contact points. In some embodiments, the touch sensing unit may sample the contact points periodically, such that successive sample times are separated in time by a sample period. In some embodiments, the characteristics of a contact point sampled by the touch sensing unit may include the positions of the contact points.

In the example of FIG. 2A, successive sample times are temporally separated by a uniform sample period. Thus, the touch illustrated in FIG. 2A is accelerating as it moves from left to right across the touch screen. The touch's acceleration is evident because the sample period is uniform, but the distance between successive sample positions is increasing over time. For example, the distance between positions p1 and p0 is relatively small, which dictates that the velocity of the contact point during the sampling period between times t1 and t0 is relatively low. By contrast, the distance between positions p3 and p2 is relatively large, which indicates that the velocity of the contact point during the sampling period between times t3 and t2 is relatively high.

Figure 2B:
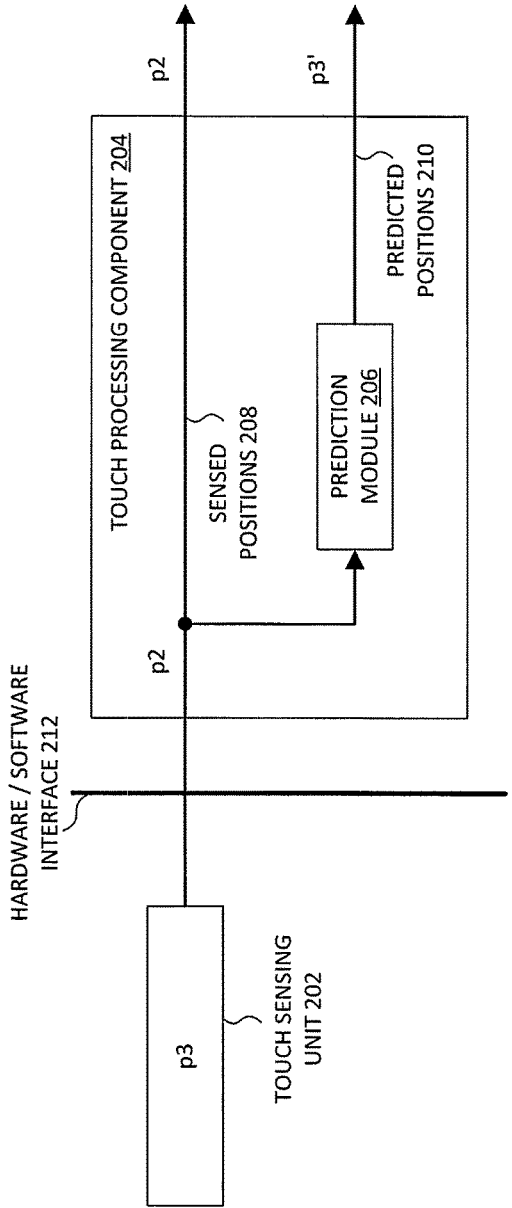
FIG. 2B is a schematic illustration of exemplary embodiments of a touch sensing unit and a touch processing component corresponding to a time t3 in FIG. 2A.

FIG. 2B is a schematic illustration of an embodiment of a touch sensing unit 202 and an embodiment of a touch processing component 204 of the computing device 200 at (or shortly after) the sample time t3 depicted in FIG. 2A. For simplicity, in the example of FIG. 2B, the latency and the sampling period of the touch sensing unit 202 are equal. Though, embodiments of the invention are not limited in this regard. The sampling period may exceed the latency of the touch sensing unit 202, or the latency of the touch sensing unit 202 may exceed its sampling period.

In the example of FIG. 2B, the touch sensing unit 202 is processing the touch data associated with position p3, the touch's contact point at sample time t3. The touch processing component 204 has received the touch data associated with position p2 (the touch's contact point at sample time t2), predicted the position p3' of the touch's contact point at sample time t3, and outputted both the sensed position p2 and the prediction position p3'. Thus, to the extent that the predicted position p3' accurately approximates the sensed position p3, the prediction of the touch processing component 204 compensates for the latency of the touch sensing unit 202.

Figure 3:
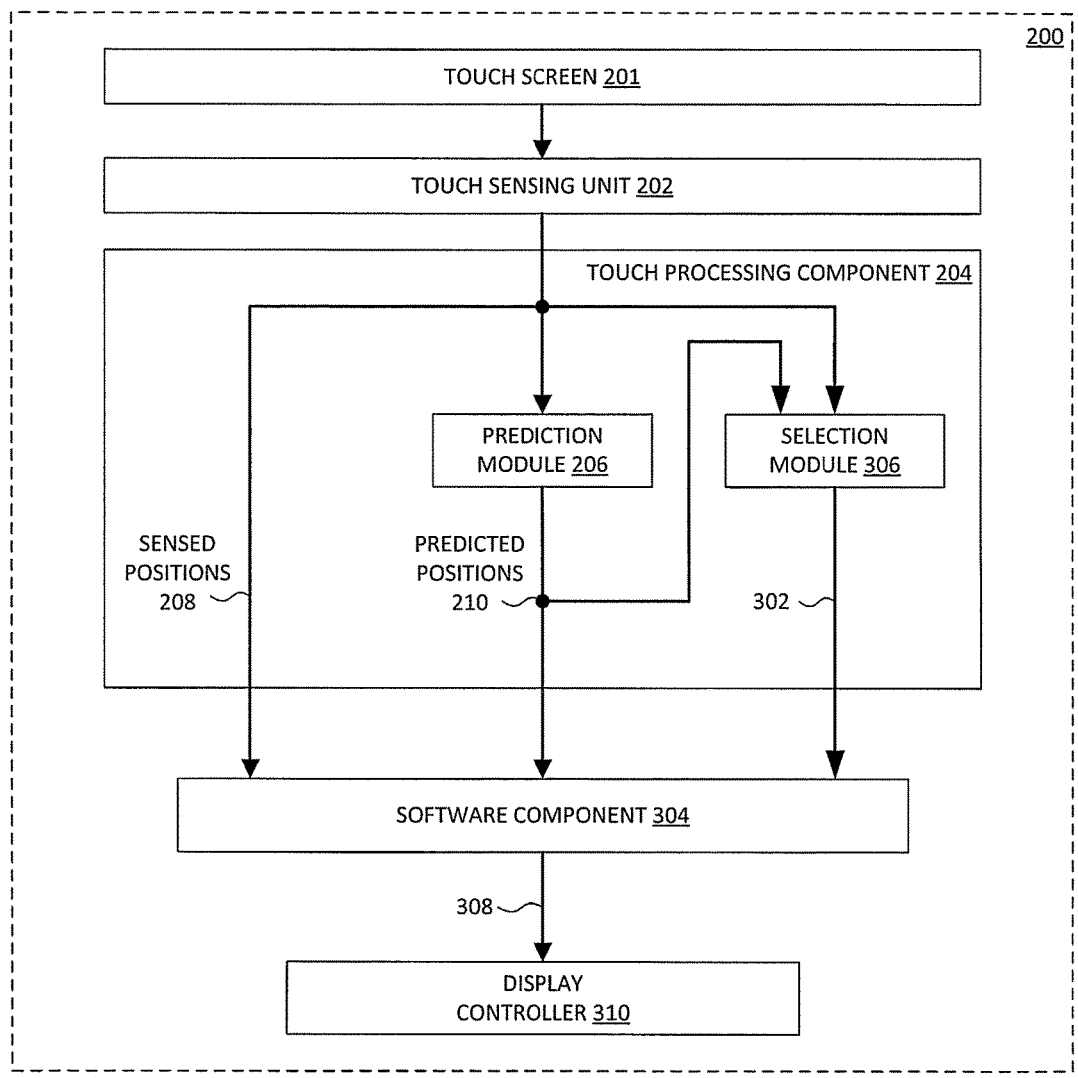
FIG. 3 is a schematic illustration of an exemplary computing device configured to implement an embodiment of the invention.

FIG. 3 is a schematic illustration of an exemplary computing device 200 configured to operate an embodiment of the invention. The computing device 200 includes a touch screen 201 configured to receive a touch input. It should be appreciated that a touch screen need not detect "touch" through sensing pressure or contact with the surface of the touch screen, In some embodiments, interfaces regarded as "touch screens" may detect a touch input by sensing capacitance associated with a finger or object in a vicinity of the touch screen. In some embodiments, interfaces regarded as "touch screens" may detect a touch input by sensing motion or position of a finger or object within a sensed region, irrespective of any relationship between a location of the sensed region and a location of the display. Accordingly, any suitable device that detects presence, position, and/or motion of an object and uses the detected presence, position, and/or motion to provide input to a computer may be regarded as a touch screen.

In the example of FIG. 3, the computing device 200 further includes a touch sensing unit 202. In some embodiments, the touch sensing unit 202 may be implemented in hardware. Though, embodiments of the touch sensing unit 202 are not limited in this regard. In some embodiments, the touch sensing unit 202 may periodically sample characteristics of touch contact points on the touch screen 201 and generate touch data describing the touch contact points, which may include the sensed positions 208 of the contact points. In some embodiments, the touch sensing unit 202 may provide the sensed positions 208 to the touch processing component 204 after a latency associated with the touch sensing unit's operation.

In some embodiments, the sensed positions 208 may be expressed as coordinates referenced to a two-dimensional coordinate plane or a three-dimensional coordinate region associated with the touch screen 201. Some embodiments of the touch processing component 204 may process sensed positions 208 and predicted positions 210 with respect to a first coordinate axis independently of sensed positions 208 and predicted positions 210 with respect to a second coordinate axis. For example, sensed positions 208 of an embodiment of the touch screen 201 associated with a tablet computer may be expressed as a pair of Cartesian coordinates along a horizontal X-axis and a vertical Y-axis in the plane of the touch screen. In some embodiments, the touch processing component may predict a subsequent x-coordinate of a touch's position based on previous x-coordinates of the touch's position, and may predict a subsequent y-coordinate of a touch's position based on previous y-coordinates of the touch's position. Though, embodiments of the invention are not limited in this regard.

In the example of FIG. 3, the computing device 200 further includes a touch processing component 204. In some embodiments, the touch processing component 204 may be a software component, such as a Touch Interface Engine. In some embodiments, the touch processing component 204 may be a component of a touch screen driver that communicates with touch screen hardware such as the touch sensing unit. In some embodiments, the touch processing component may be a component of the operating system that communicates with the touch screen driver.

Embodiments of the touch processing component 204 may receive sensed positions 208 of touch screen contact points after a latency associated with the touch sensing unit 202. In some embodiments, the touch processing component 204 may provide the sensed positions 208 as inputs to a prediction module 206, which may output one or more predicted positions 210 of the touch screen contact points. The predicted positions 210 may correspond to times subsequent to the times associated with the sensed positions 208.

In some embodiments, whenever the prediction module 206 receives a sensed position from the touch sensing unit 202 corresponding to the position of a contact point at a time t, the prediction module may predict a subsequent position of the contact point at a time t+latency, where latency is the latency of the touch sensing unit. In this manner, embodiments of the touch prediction module may compensate for the latency of the touch sensing unit. Though, embodiments are not limited in this regard. Embodiments may predict a subsequent position of the contact point corresponding to any subsequent time.

By predicting a subsequent position of the contact point at the time t+latency, embodiments of the prediction module may predict a subsequent position of the contact point at the next sample time. That is, embodiments of the prediction module may predict the next sensed position of a contact point. This relationship holds true if the touch sensing unit's latency and sample period are equal.

Embodiments of the prediction module may predict a subsequent position of the contact point at a time t+n*sample_period, where n is an integer and sample_period is the touch sensing unit's sample period. In this manner, embodiments of the touch prediction module may predict the position of the contact point at a time that is n sample periods after the sample time of the sensed position most recently received by the prediction module. If the touch sensing unit's sample period is less than the touch sensing unit's latency (i.e., the touch sensing unit is pipelined), n may be chosen such that n*sample_period is greater than latency. In this manner, embodiments may generate predicted positions corresponding to actual sample times, while continuing to compensate for the latency of the touch sensing unit.

In the example of FIG. 3, the computing device 200 further includes a selection module 306. In some embodiments, the selection module may generate a selection indication 302 based on the sensed positions and/or the predicted positions. That is, embodiments of the selection module may treat either the stream of sensed positions of the touch or the stream of predicted positions of the touch as the input to the touch screen, and generate a selection indication 302 accordingly. Some embodiments of the selection module may select between the sensed positions and the predicted positions based on a characteristic of the sensed touch, such as the touch's number of contact points, the touch's duration, the location(s) of the touch's contact point(s), the touch's trajectory (i.e. path, velocity, and/or acceleration), the touch's type (e.g., tap, press, swipe, etc.) and/or a command corresponding to the touch (e.g., select, pan, etc.). In some embodiments, the selection module may select the predicted positions when the touch corresponds to a pan operation, and/or when the touch is a swipe. In some embodiments, the selection module may select the predicted positions when a confidence measure associated with the accuracy of the predicted positions exceeds a confidence threshold.

Embodiments of the touch processing component 204 may provide the sensed positions 208, the predicted positions 210, and the selection indication 302 to a software component 304. Software component 304 may be a component of the operating system, an application, or any other software executing on computing device 200. In some embodiments, software component 304 may select the sensed positions 208 or the predicted positions 210, based on the selection indication 302 or any other suitable criteria, and provide the selected positions 308 to a display controller 310. Accordingly, the software component 304 may rely on the selection made by the selection module 306, or may override the selection module's selection. The software component 304 and the selection module 306 each may select between the sensed positions 208 and the predicted positions 210 using techniques as are known in the art or any other suitable techniques.

In the example of FIG. 3, the computing device 200 further includes the display controller 310. As described above, embodiments of the display controller 310 may control the touch screen display based on the selected positions 308 provided by a software component 304.

Figure 4:
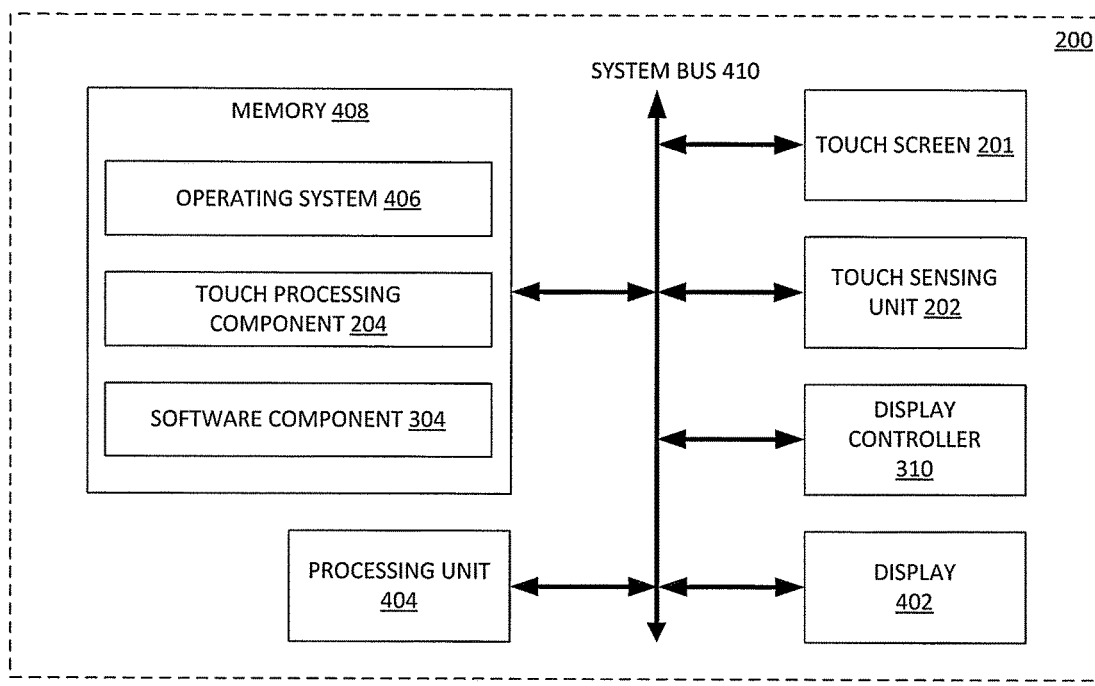
FIG. 4 is a schematic illustration of an exemplary embodiment of a touch processing component.

FIG. 4 is a block diagram of an exemplary computing device 200 configured to implement an embodiment of the invention. The exemplary computing device of FIG. 4 includes a touch screen 201, a touch sensing unit 202, a touch processing component 204, a display 402, a software component 304, and a display controller 310. Embodiments of these components have been described in connection with FIG. 3. The touch sensing unit 202 may be configured to sense a touch of the touch screen 201 and to provide sensed positions 208 of the touch. The display controller 310 may be configured to control the display 402 based on selected positions 308.

In this example, the processing unit 404, system bus 410, memory 408, and operating system 406 may be components as are known in the art or any other suitable components. The processing unit 404 may execute instructions of software components such as an operating system 406, the touch processing component 204, and the software component 304. The memory 408 may store instructions which, when executed by the processing unit 404, cause the apparatus to perform a method for predictively compensating for the latency associated with the touch screen 201. The method may comprise predicting, by a touch processing component 204, predicted positions 210 of the touch, based at least in part on the sensed positions 208 received from the touch sensing unit 202. The method may further comprise making a selection, by the touch processing component 204, between the predicted positions 210 or the sensed positions 208 based on a characteristic of the touch. The method may further comprise controlling the display 402 based on the selected positions 308 received by the display controller 310.

In the example, the touch screen 201 and the touch sensing unit 202 are depicted as distinct components. Though, the touch screen 201 and the touch sensing unit 202 may be integrated Likewise, in the example, the display controller 310 and the display 402 are depicted as distinct components, though they may be integrated.

Figure 5:
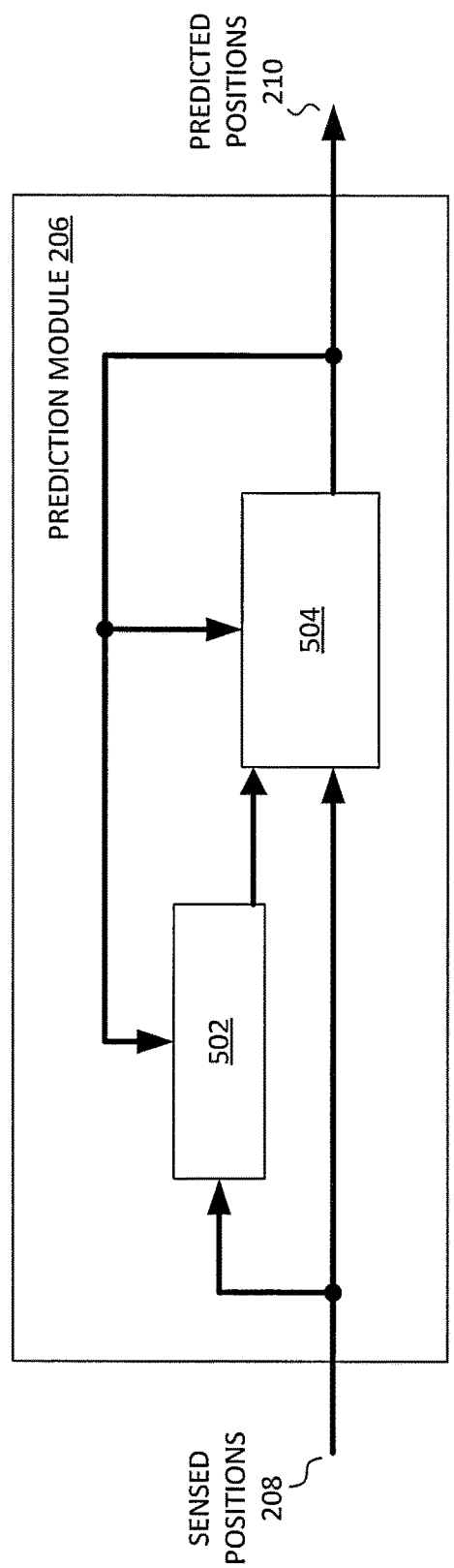
FIG. 5 is a schematic illustration of an exemplary embodiment of a prediction module of an exemplary touch processing component.

FIG. 5 is a schematic illustration of an exemplary embodiment of a prediction module 206 of an exemplary touch processing component 204. The prediction module may use a filter to predict changes in the position of a touch contact point during a specified time period based on sensed changes in the position of the touch contact. As discussed above, the time period may be equal to a sample period of the touch sensing unit, a latency of the touch sensing unit, or any other suitable value. The filter may be a predictive filter as known in the art or any other suitable filter. For example, the filter may be an adaptive finite impulse response (FIR) filter. The parameters of the filter may be adjustable.

Inputs and/or outputs of the filter may be adjusted to limit the predicted change in position in some cases. For example, the magnitude or direction of the predicted change may be limited. As another example, smoothing techniques that damp the predicted change in position or selectively impose limits on the predicted change in position may be applied to inputs and/or outputs of the filter.

In the example of FIG. 5, the prediction module 206 comprises a parameter generation module 502 and a prediction calculation module 504. Embodiments of the parameter generation module 502 may receive as inputs the sensed positions 208 of the touch and the predicted positions 210 of the touch. The predicted positions 210 may be fed back from an output of the prediction calculation module 504. Such feedback may be achieved by configuring the prediction calculation module 504 to store the predicted positions 210 in a data set, and configuring the parameter generation module 502 to read the predicted positions 210 from the data set. The data set could be maintained, for example, by the operating system. In some embodiments, the parameter generation module 502 may compute values of parameters used by the prediction calculation module 504.

In some embodiments, a parameter's value may depend on a characteristic of the touch sensing unit 202 and/or a characteristic of a touch. Characteristics of the touch sensing unit 202 on which a prediction parameter's value may depend include the unit's latency, sampling rate, and/or any other suitable attributes. In some embodiments, the touch processing component 204 may be configured to receive, retrieve, or detect characteristics of the touch sensing unit 202. For example, embodiments of the touch processing component 204 may retrieve information regarding characteristics of a touch sensing unit from a database maintained by or accessible to the computer 200.

Additionally or alternatively, a user may supply such information. The user may obtain the information in any suitable manner. For example, the user may obtain the information from a description of the touch screen's specification, which may be provided with the computer or published on a touch screen vendor's website. As another example, the user may estimate the touch sensing unit's latency based on observed lag. In such a case, the user may fine-tune the estimate based on observations of the touch screen's performance when the estimate is used.

The latency of the touch screen 201 may be determined by analyzing images or videos of the touch screen's operation, the images or videos being collected by a high-speed camera. The latency of the touch sensing unit 202 may be distinguished from the latency of other touch screen components by configuring the touch screen's software to report its latency. The determined latency of the touch sensing unit 202 may be disseminated in any suitable manner, such as through a database or a website, as discussed above. Though, the prediction module 206 may obtain the touch sensing unit's latency in any suitable manner. Embodiments of the invention are not limited in this regard.

In some embodiments, the touch processing component 204 may determine the touch sensing unit's sample period by measurement. For example, the touch processing component 204 may measure the time that elapses between arrivals of sensed positions 208 sampled by the touch sense unit 202. The touch processing component 204 may measure the elapsed time period using techniques that are known in the art or any other suitable techniques. For example, the touch processing component 204 may use a kernel mode utility that accesses a system clock to determine the arrival time of a sensed position sample.

Characteristics of the touch on which a prediction parameter's value may depend include characteristics of the touch's trajectory (e.g., path, velocity, and acceleration), the touch's sensed positions, and/or any other suitable attributes. In some embodiments, the prediction module 206 may calculate the velocity of a touch contact point over a sample period as follows: velocity=(p_end−p_start)/sample period, where p_end is the contact point's position at the end of the sample period and p_start is the contact point's position at the beginning of the sample period. Likewise, some embodiments of the prediction module 206 may calculate the acceleration of a touch contact point over a sample period as follows: accel=(v2−v1)/sample_period, where v2 is the contact point's velocity during a given sample period, and v1 is the contact point's velocity during the preceding sample period.

In some embodiments, the prediction parameters calculated by the parameter generation module 502 and used by the prediction calculation module 504 may include a change in position of the touch contact point, a velocity of a touch contact point, an acceleration of a touch contact point, and/or a maximum detected acceleration of a touch contact point. Formulas for calculating the velocity and acceleration of a touch contact point are given above. A change in position delta_pos of the touch contact point may be computed as follows: delta_pos=p_end−p_start, where p_end is the contact point's position at the end of the sample period and p_start is the contact point's position at the beginning of the sample period.

Embodiments of the parameter generation module 502 may determine the maximum detected acceleration of a touch contact point in the following manner. First, the acceleration of the touch contact point over an initial sample period may be recorded as the maximum detected acceleration. When the embodiment of the parameter generation module 502 computes an acceleration of the touch contact point over a subsequent sample period, the embodiment may overwrite the maximum detected acceleration with the acceleration over the sample period if the acceleration over the sample period is the greater of the two values.

In some embodiments, the prediction parameters calculated by the parameter generation module 502 may include a smoothing parameter a, such as an exponential smoothing parameter. Embodiments of the parameter generation module 502 may calculate the value of the smoothing parameter as follows: a=accel/max_accel, where accel is the acceleration of the touch contact point during a most recent sample period, and max_accel is an the maximum detected acceleration of the touch contact point during any sample period.

In some embodiments, the prediction parameters calculated by the parameter generation module 502 may include a change in acceleration (delta_accel) between two sample periods, such as successive sample periods. A change in acceleration between two sample periods may be computed as the difference between the accelerations during the two sample periods.

In some embodiments, the prediction parameters calculated by the parameter generation module 502 may include a limit (L) on a predicted change in position of the touch contact point. Embodiments of the parameter generation module 502 may calculate the value of the limit L as follows: L=velocity*latency, where velocity is the velocity of a contact point over a sample period, such as the most recent sample period (i.e. the sample period associated with the sensed position 208 most recently received by the touch processing component 204). In other words, some embodiments of the parameter generation module 502 may limit the predicted change in position of the touch contact point based on an assumption that the velocity of the touch contact point during the lag time covered by the prediction does not exceed the velocity of the touch contact point during the most recent sample period.

Some embodiments of the parameter generation module 502 may further limit the predicted change in position of the touch contact point. For example, some embodiments may damp the limit L when the motion of the touch contact point is decelerating. That is, some embodiments may further limit L by multiplying L by a damping value damp when deceleration is detected. In some embodiments, deceleration may be detected if the acceleration during a most recent sample period is less than an acceleration during a preceding sample period. In some embodiments, the damping value damp may be a value between 0.0 and 1.0, and may be related to the smoothing parameter α as follows: damp=1−α.

In some embodiments, the prediction parameters calculated by the parameter generation module 502 may include parameters of a filter used by the prediction calculation module 504. The values of these filter parameters may be calculated based on the sensed positions 208 and the predicted positions 210.

In one aspect, the prediction calculation module 504 may use the prediction parameters and the sensed positions 208 to calculate a predicted position of a touch contact point at a time subsequent to the times associated with the sensed positions 208. The operation of the prediction calculation module 504 is discussed further in connection with FIGS. 6-10 below.

Figure 6:
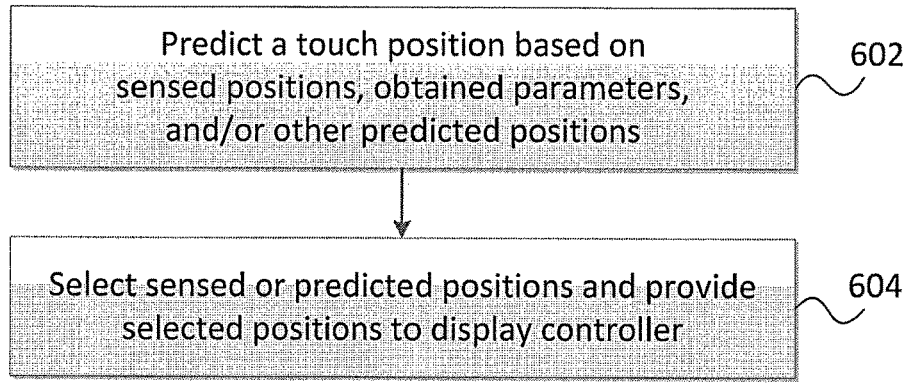
FIG. 6 is a flow chart of an exemplary process of predictively compensating for a latency associated with a touch screen.

FIG. 6 depicts an exemplary method of predictively compensating for a latency associated with a touch screen. The latency may be associated with the touch screen as a whole, with a set of components of the touch screen, or with an individual component, such as a touch sensing unit. At act 602 of the exemplary method, a position of a touch contact point may be predicted. In particular, the contact point may be predicted to occupy the predicted position at a time subsequent to the times associated with sensed positions of the contact point. Computation of the predicted position may be based on the sensed positions of the contact point, prediction parameters, and/or previously predicted positions of the contact point. Additional aspects of the act of determining a predicted position are discussed below in connection with FIGS. 8-10.

In embodiments of act 604 of the exemplary method, the sensed positions 208 or the predicted positions 210 may be selected and provided to a display controller 310. In some embodiments, a touch processing component 204 of the touch screen may select between the sensed and predicted positions, and may provide an indication of the selection to a software component, such as a component of the operating system or an application. In some embodiments, the software component may provide the positions selected by the touch processing component to the display controller. In some embodiments, the software component may override the touch processing component's selection by selecting between the sensed and predicted positions anew, and by providing the positions selected by the software component to the display controller.

Figure 7:
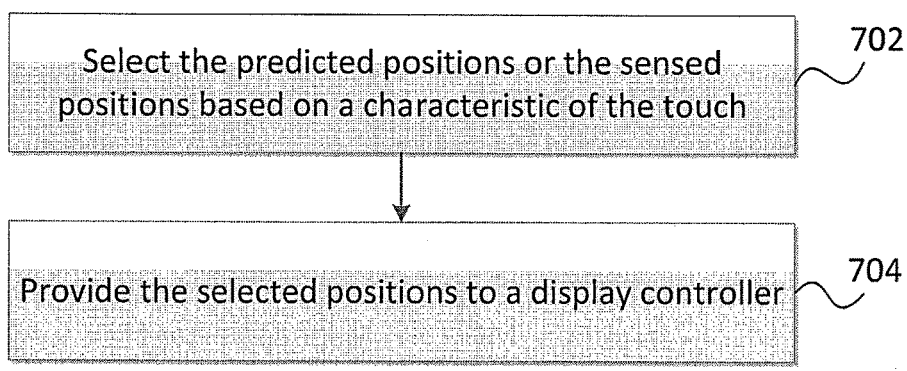
FIG. 7 is a flow chart of an exemplary process of selectively controlling a display based on predicted positions or sensed positions of a touch.

FIG. 7 depicts an exemplary method of selecting sensed or predicted positions and providing the selected positions to a display controller. At act 702 of the exemplary method, either the predicted positions or the sensed positions may be selected based on a characteristic of the touch, such as the touch's number of contact points, the touch's duration, the location(s) of the touch's contact point(s), the touch's trajectory (i.e. path, velocity, and/or acceleration), the touch's type (e.g., tap, press, swipe, etc.) and/or a command corresponding to the touch (e.g., select, pan, etc.). In some embodiments, an application may rely on predicted positions for some contact points and sensed positions for other contact points if the characteristics of the contact points differ.

Characteristics of a touch may be determined using techniques as are known in the art or any suitable techniques. For example, a touch's number of contact points, duration, and/or location may be sensed and provided to the touch processing component 204 by the touch sensing unit 202. The touch's trajectory may be characterized by or derived from stored values of the sensed positions 208 and/or the velocity and acceleration values corresponding to the sample periods. A touch's type may be sensed by the touch processing unit 202 and fed forward to the touch processing component 204, determined by the touch processing component 204, or determined by another component of the touch screen and fed back to the touch processing component 204. A touch's type may be sensed or determined based on a duration, position, trajectory, and/or pressure associated with the touch's contact points. A command corresponding to the touch may be determined by an operating system or an application and fed back to the touch processing component 204.

The criteria used to select between the sensed positions and the predicted positions may vary among the operating system and various applications because the benefits of using correctly predicted positions (rather than potentially lagging sensed positions) and the risks of using incorrectly predicted positions (rather than potentially lagging sensed positions) may vary in different contexts. Likewise, the selection criteria used by a given operating system or application may vary at different times based on risk-benefit considerations or any other considerations. Risk-benefit analysis or analysis of other considerations may be carried out by a programmer of the software component, and the results of the analysis may be incorporated into the software component.

For example, in an application where a swipe with a lone contact point is typically associated with a command to move an object, and lag in the object's movement may be apparent or frustrating to a user, the application may be configured to rely on predicted positions during such swipes. If touches with multiple contact points typically correspond to commands to adjust a magnification of the display, the same application may be configured to rely on sensed positions during such touches. By contrast, in another application where a touch with multiple contact points is typically associated with a command to alter (e.g., to rotate, expand, compress, or move) a displayed object, the other application may rely on predicted positions during such touches.

In some cases, the accuracy of the predicted positions may tend to improve as the duration of a touch contact point increases. Accordingly, an application may rely on the predicted positions after the a contact point's duration exceeds a specified threshold. Such a threshold may be configurable within an application and may vary among applications.

In some cases, the location of a predicted position may determine whether a software component relies on the predicted positions or the sensed positions. For example, if a predicted position is outside a window or display region associated with a current software component, the software component may rely on the sensed positions rather than predictively transferring control to a software component associated with an adjacent window or display region.

In some cases, the trajectory of the touch may determine whether a software component relies on the predicted positions or the sensed positions. For example, if the trajectory of the touch is erratic (e.g., characterized by erratic changes in direction, speed, or acceleration), the software component may rely on the sensed positions. Whether a touch's trajectory is unacceptably erratic may be determined by techniques as are known in the art. For example, a software component may compute the frequency of a touch's changes in direction, the mean time between a touch's changes in direction, the standard deviations of a touch's speed and acceleration, etc. The software component may then compare these measurements to configurable threshold values.

In some cases, the predicted positions may be selected when the touch corresponds to a pan operation, when the touch is a swipe, and/or when a confidence measure associated with the accuracy of the predicted positions exceeds a confidence threshold. Such a threshold may be configurable.

At act 704 of the exemplary method, the selected positions may be provided to the display controller. In some embodiments, the touch processing component may make an initial selection between the predicted and sensed positions, and a software component may rely on that initial selection or override it. The software component may provide the selected positions to the display controller.

Figure 8:
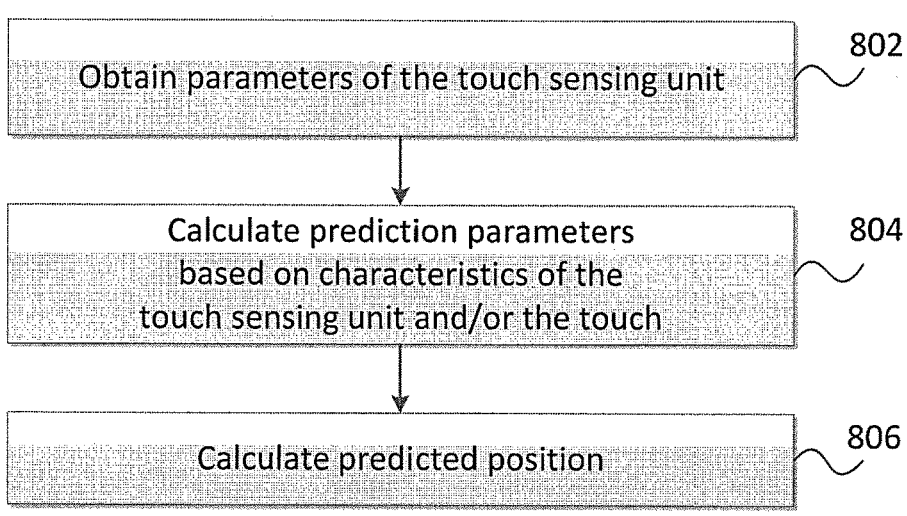
FIG. 8 is a flow chart of an exemplary process of predicting a position of a touch.

FIG. 8 depicts an exemplary method of determining a predicted position of a touch contact point. At act 802 of the exemplary method, one or more parameters of the touch sensing unit may be obtained. As discussed above, the parameters of the touch sensing unit may be obtained by any suitable method. In some embodiments of act 802, a latency of the touch sensing unit and a sample period of the touch sensing unit may be obtained.

At act 804 of the exemplary method, prediction parameters may be calculated based on the characteristics of the touch sensing unit and/or characteristics of the touch. Additional aspects of the act of calculating prediction parameters are discussed below in connection with FIG. 9.

At act 806 of the exemplary method, a predicted position of the touch contact point is calculated based on the prediction parameters calculated in act 804 and the sensed positions 208 of the touch. Additional aspects of the act of calculating a predicted position of a touch contact point are discussed below in connection with FIG. 10.

Figure 9:
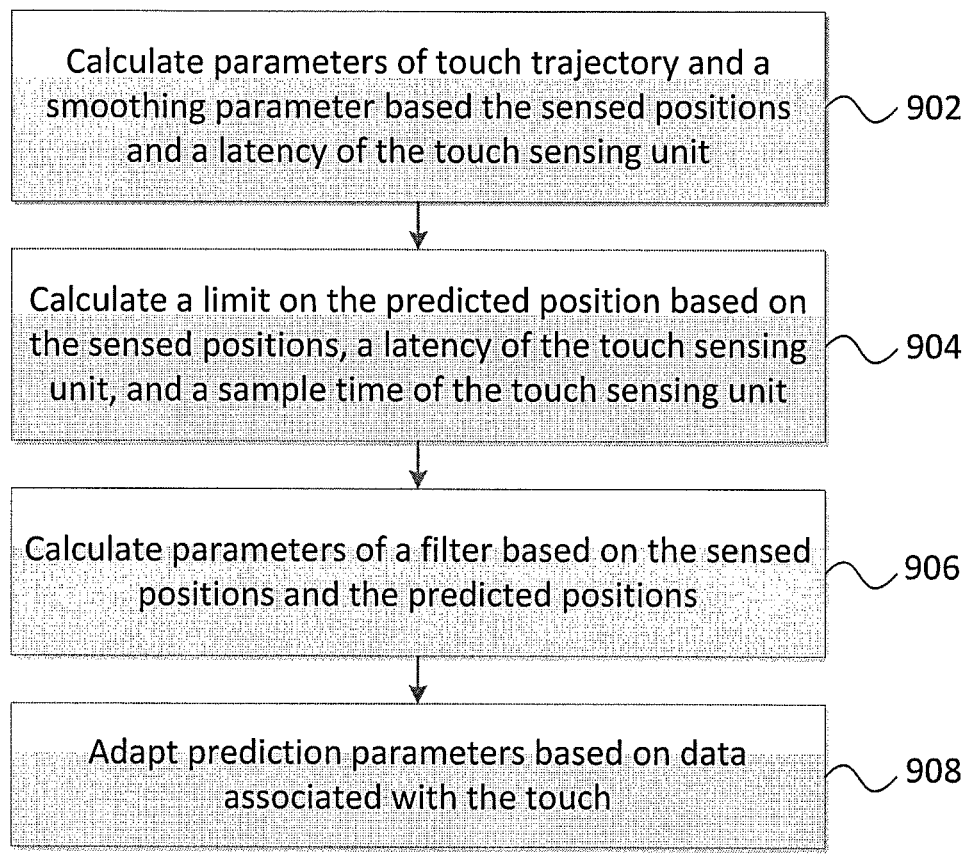
FIG. 9 is a flow chart of an exemplary process of calculating prediction parameters.

FIG. 9 depicts an exemplary method of calculating prediction parameters. At act 902 of the exemplary method, parameters of a trajectory of a touch contact point may be calculated based on the sensed positions 208 and a latency of the touch sensing unit. In some embodiments, parameters may be initialized to default values when a touch contact point is initially detected. For example, a velocity, acceleration, maximum acceleration, and/or smoothing parameter associated with the touch contact point may each be initialized to zero.

A change in the contact point's position during a most recent sample period delta_pos may be calculated as follows: delta_pos=p_end−p_start, where p_end is the contact point's position at the end of the sample period and p_start is the contact point's position at the end of the previous sample period. Based on the contact's point change in position, the velocity of the contact point may be calculated as follows: velocity=delta_pos/sample_period.

If the contact point's velocity is non-zero, several additional calculations may be performed. The point's velocity may be rounded to provide numerical stability (i.e. to avoid numerical overflow or underflow). The point's acceleration may be calculated as follows: accel=(velocity−prev_velocity)/sample_period, where prev_velocity is the contact point's velocity during the preceding sample period. Based on the point's acceleration, the point's maximum acceleration (max_accel) may be determined as described above. If the point's maximum acceleration is non-zero, a smoothing parameter may be computed as follows: α=accel/max_accel.

Further, a change in acceleration may be calculated as follows: delta_accel=accel−prev_accel, where prev_accel is the contact point's acceleration during the preceding sample period. The computed values of the point's velocity and/or acceleration may be stored as prev_velocity and prev_accel for use in a subsequent set of calculations.

At act 904 of the exemplary method, a limit (L) on a predicted change in a position of the touch contact point may be calculated. An exemplary method of calculating a value for this parameter is discussed above.

At act 906 of the exemplary method, parameters of a filter of the prediction calculation module 504 may be calculated based on the sensed positions 208 and the predicted positions 210.

At act 908 of the exemplary method, at least one of the prediction parameter values calculated in acts 902-906 may be recalculated to account for new data. For example, a prediction parameter may be recalculated when a new sensed position is received from the touch sensing unit.

Figure 10:
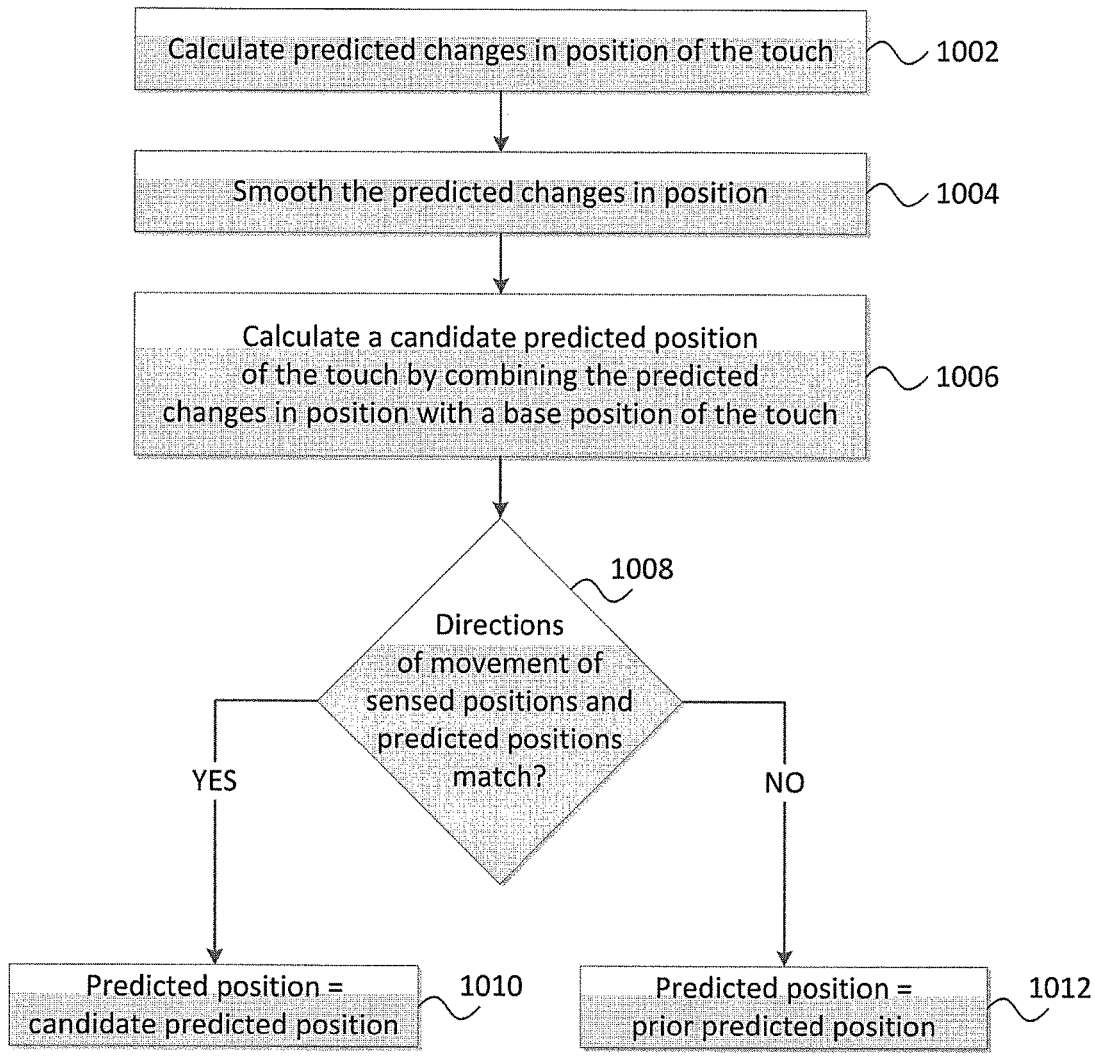
FIG. 10 is a flow chart of an exemplary process of calculating a predicted position of a touch.

FIG. 10 depicts an exemplary method of calculating a predicted position of a touch. At act 1002 of the exemplary method, multiple, incremental changes in the position of a touch contact point may be calculated in response to receiving a new sensed position from the touch processing unit. The predicted incremental changes in the position of the touch may be calculated by inputting some or all of the sensed positions 208 and some or all of the predicted positions 210 into a filter. In some embodiments, the filter may be a predictive filter. In some embodiments, the predictive filter may be a finite impulse response (FIR) filter. In some embodiments, the predictive filter may be an adaptive filter or an adaptive FIR filter. In some embodiments, the predictive filter may be a three-tap recursive least squares (RLS) filter.

Parameters of the filter may be the parameters calculated at act 906 of FIG. 9. In response to the inputs, the filter may output a specified number of predicted, incremental changes in a position of the touch contact. Alternatively, the filter may output predicted, incremented changes in a position of the touch contact until the magnitude of the current incremental change in position falls below a specified threshold. Though, embodiments of the invention are not limited in this regard.

At act 1004 of the exemplary method, the incremental changes in the position of the touch contact point may be smoothed by a smoothing filter. The smoothing filter may be an exponential filter adapted to use the smoothing parameter α calculated at act 902 of FIG. 9. That is, the smoothing filter may have the following form: sICIP[n]=α*ICIP[n−1]+(1−α)*sICIP[n−1], where sICIP[i] is the i-th smoothed incremental change in position, ICIP[i] is the i-th unsmoothed incremental change in position, and sICIP[1] is initialized to the value of ICIP[0]. Though, embodiments are not limited with regard to the smoothing technique used by the smoothing filter. Any suitable smoothing technique may be used.

At act 1006 of the exemplary method, a candidate predicted position of the touch contact point may be calculated by combining the smoothed, incremental changes in position with a base position of the touch contact point. In some embodiments, the base position of the touch contact point may be the sensed position of the touch contact point most recently received from the touch sensing unit. The candidate predicted position may be a potential position of the touch contact point at a time subsequent to the time associated with the sensed base position.

At act 1008 of the exemplary method, it may be determined whether a direction of movement to a most recently received sensed position from a preceding sensed position matches a direction of movement to the candidate predicted position from a most recently predicted position. In other words, it may be determined whether selecting the candidate predicted position as the next predicted position would move the trajectory of prediction positions 210 in the same direction that the touch contact point actually moved during the most recent sample interval. If so, the candidate predicted position may be selected as the predicted position at act 1010. If not, the preceding predicted position may be selected as the predicted position at act 1012. After selection, the predicted position is stored.

In this way, embodiments may check for retrograde motion in the stream of predictions. If retrograde motion is detected at step 1008, embodiments may clamp the predicted position at its current value, rather than predicting that the direction of motion in the next sample interval will be opposite the direction of motion in the most recent sample interval.

Having thus described several embodiments of this invention, it is to be appreciated that various alterations, modifications, and improvements will readily occur to those skilled in the art. For example, the foregoing paragraphs describe apparatuses and methods in which the sensed positions of a touch contact point are sent by the touch sensing unit 202 directly to the touch processing component 204, the prediction module 206, and the control module 306. However, the sensed positions 208 may undergo additional processing (e.g., smoothing or noise filtering) before being sent to some components. In some embodiments, the parameters of the filter of the predication calculation module 504 contained in the prediction module 206 may be calculated based on the sensed positions provided by the touch sensing unit 202, while other techniques described above may be based on a processed version of the sensed positions 208.

In addition, it is described that a computing device implementing an embodiment of the apparatus may receive sensed positions of a touch input and provide predicted positions of the touch input. However, the input need not be a touch input, and the sensed or predicted attribute of the input need not be a position of the input. The input may be any input known in the art or suitable for inputting to a computer, and the sensed or predicted attribute may be any attribute of the input. For example, the input may be a speech signal, and the sensed or predicted attribute may be the signal's pitch. As another example, the input may be a video signal, and the sensed or predicted attribute may be the position of an object in the video frame.

Likewise, it is described that a computing device implementing an embodiment of the apparatus may control a display based on the sensed or predicted input. However, the controlled output device need not be a display. The controlled output device may be any output device known in the art or suitable for outputting information from a computer. For example, the output device may be a speaker or a radio transmitter.

In addition, it is described that a computing device implementing an embodiment of the apparatus may include a processing unit and a memory. Embodiments of the computing device may include one or more processing units and one or more memory units.

Such alterations, modifications, and improvements are intended to be part of this disclosure, and are intended to be within the spirit and scope of the invention. Further, though advantages of the present invention are indicated, it should be appreciated that not every embodiment of the invention includes every described advantage. Some embodiments may not implement any features described as advantageous herein. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices may be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology, may operate according to any suitable protocol, and may include wireless networks, wired networks or fiber optic networks.

Also, the various methods or processes outlined herein may be coded as software that is executable on one or more processors of computers that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above.

As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that, when executed, perform embodiments of the inventive method need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Also, the invention may be embodied as a method, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method of predictively compensating for a latency associated with a touch screen of a computer, the method comprising:
receiving, within the computer, at time $t_1$, first reporting of a first sensed position of a touch;
predicting, by the computer, a position of the touch at time $t_2$, based at least in part on characteristics of a touch sensing unit of the computer and the first sensed position of the touch first reported at time $t_1$, where $t_2$ is later than $t_1$;
outputting, internally within the computer, the predicted position of the touch at time $t_2$ as a potential alternative for programmatic selection over a second sensed position of the touch second reported at time $t_2$;
determining a type of the touch, the type being one of a tap, a press, or a swipe; and
upon determining that the type of the touch is a first type comprising one of the tap, the press, or the swipe, displaying the predicted position of the touch at time $t_2$; and
upon determining that the type of the touch is a second type comprising one of the tap, the press, or the swipe, displaying the second sensed position of the touch second reported at time $t_2$ wherein the first type is not the same as the second type.

2. The method of claim 1, wherein the programmatic selection between the predicted position of the touch at time $t_2$ and the second sensed position of the touch second reported at time $t_2$ is performed by at least one of a touch processing component associated with the touch screen or an application.

3. The method of claim 1, wherein the programmatic selection between the predicted position of the touch at time $t_2$ and the second sensed position of the touch second reported at time $t_2$ is associated with a pan command.

4. The method of claim 1, wherein predicting a position of the touch at time $t_2$ comprises:
calculating a plurality of prediction parameters; and
calculating, based at least in part on the plurality of prediction parameters and the characteristics of the touch sensing unit of the computer, the predicted position of the touch at time $t_2$.

5. The method of claim 4, wherein calculating the plurality of prediction parameters comprises calculating at least one of a plurality of trajectory parameters associated with the first sensed position first reported at time $t_1$, a smoothing parameter, a limit on the predicted position of the touch at time $t_2$, and a plurality of parameters associated with an adaptive filter.

6. The method of claim 4, wherein calculating the predicted position of the touch at time $t_2$ comprises:
calculating a plurality of predicted changes in position of the touch;
smoothing the plurality of predicted changes in position of the touch; and
calculating a candidate predicted position of the touch by combining the plurality of predicted changes in position of the touch with a base position of the touch.

7. The method of claim 6, wherein the candidate predicted position of the touch is the predicted position of the touch at time $t_2$.

8. The method of claim 6, wherein:
calculating the predicted position of the touch at time $t_2$ further comprises selecting, as the predicted position of the touch at time $t_2$, one of the candidate predicted position of the touch and a prior predicted position of the touch,
the prior predicted position of the touch is associated with a time prior to the time associated with the candidate predicted position, and
the selecting of the predicted position of the touch at time $t_2$ is based on a direction of movement associated with the first sensed position first reported at time $t_1$ and on a direction of movement between the prior predicted position and the candidate predicted position.

9. The method of claim 1, wherein the first type is a different type than the second type.

10. An apparatus for predictively compensating for a latency associated with a touch screen of a computer, the computer including a touch sensing unit, a display, and a controller of the display, the touch sensing unit configured to sense a touch of the touch screen and to provide a plurality of sensed positions of the touch, the display controller configured to control the display based on a selected plurality of positions, the apparatus comprising:
a processing unit; and
a memory storing instructions which, when executed by the processing unit, cause the apparatus to perform a method of:
receiving at time $t_1$, by a touch processing component, from the touch sensing unit, first reporting of a first sensed position of a touch;
predicting, by the touch processing component, a position of the touch at time $t_2$, based at least in part on characteristics of the touch sensing unit of the computer and the first sensed position of the touch first reported at time $t_1$, where $t_2$ is later than $t_1$, said first sensed position first reported at time $t_1$ is filtered by a first filter and said predicted position of the touch at time $t_2$ extending beyond the first sensed position of the touch first reported at time $t_1$;
programmatically making a selection, by the touch processing component, between the predicted position of the touch at time $t_2$ and a second sensed position of the touch second reported at time $t_2$, based at least in part, on a type of the touch and on comparing a confidence measure associated with an accuracy of the predicted position of the touch at time $t_2$ with a confidence threshold, wherein the type of the touch is one of a tap, a press, or a swipe, said predicted position of the touch at time $t_2$ being further limited according to a second filter; and
controlling the display based on the programmatic selected one of the predicted position of the touch at time $t_2$ when the type of the touch is a first type comprising one of the tap, the press, or the swipe, and the second sensed position of the touch second reported at time $t_2$ when the type of the touch is a second type comprising one of the tap, the press, or the swipe, wherein the first type is not the same as the second type.

11. The apparatus of claim 10, further comprising providing, by the touch processing component, the predicted position of the touch at time $t_2$, the second sensed position second reported at time $t_2$, and an indication of the selection, to a software component for the software component to make the programmatic selection.

12. The apparatus of claim 11, further comprising the software component programmatically selecting the predicted position of the touch at time $t_2$ regardless of whether the touch processing component selected the predicted position of the touch at time $t_2$.

13. The apparatus of claim 10, wherein predicting the position of the touch at time $t_2$ comprises:
calculating a plurality of prediction parameters based on at least in part on a characteristic of the touch sensing unit and a characteristic of the touch; and
calculating the position of the touch at time $t_2$, based at least in part on the plurality of prediction parameters.

14. The apparatus of claim 13, wherein calculating the plurality of prediction parameters comprises calculating at least one of a velocity of the touch, an acceleration of the touch, a maximum acceleration of the touch, or a smoothing parameter, based on the first sensed position first reported at time $t_1$, and on a latency associated with the touch sensing unit.

15. The apparatus of claim 13, wherein calculating the plurality of prediction parameters comprises calculating a limit on the predicted position of the touch at time $t_2$ based on the first sensed position of the touch at time $t_1$, a latency associated with the touch sensing unit, and a sample time associated with the touch sensing unit.

16. The apparatus of claim 13, wherein calculating the plurality of prediction parameters comprises calculating a plurality of parameters associated with an adaptive filter based on the first sensed position of the touch at time $t_1$ and the predicted position of the touch at time $t_2$.

17. A method of predictively compensating for a latency associated with an input device of a computer, the computer including an input sensing unit, an output device, and a controller of the output device, the input sensing unit configured to sense input and to provide a plurality of sensed inputs including a first sensed input first provided at time $t_1$, the output device controller configured to control the output device based on a selected plurality of inputs, the method comprising:
obtaining a plurality of characteristic parameters of the input sensing unit;
calculating a plurality of prediction parameters of an input processing component based on the plurality of characteristic parameters of the input sensing unit and on the first sensed input first provided at time $t_1$, said first sensed input first provided at time $t_1$ being filtered by a first filter;
obtaining additional data associated with the first sensed input first provided at time $t_1$, wherein the additional data includes at least one of a number of contact points of the first sensed input, a duration of the first sensed input, and a command associated with the first sensed input;
adapting the plurality of prediction parameters, said predicted parameters being further limited according to a second filter, based on the additional data associated with the first sensed input;
predicting an input at time $t_2$, where $t_2$ is later than $t_1$, based on the plurality of adapted prediction parameters, which were initially calculated based on the plurality of characteristic parameters of the input sensing unit, and on the first sensed input provided at time $t_1$; and
programmatically selecting between the predicted input at time $t_2$ and a second sensed input second provided at time $t_2$, based, at least in part, on the following:
comparing a confidence measure associated with an accuracy of the plurality of prediction parameters with a confidence threshold; and
determining a type of the first sensed input, the type being one of a tap, a press, or a swipe; and
upon determining that the type of the first sensed input is a first type comprising one of the tap, the press, or the swipe, displaying the predicted input at time $t_2$; and
upon determining that the type of the first sensed input is a second type comprising one of the tap, the press, or the swipe, displaying the second sensed input provided at time $t_2$ wherein the first type is not the same as the second type.

18. The method of claim 17, wherein obtaining a plurality of characteristic parameters of the input sensing unit comprises:
receiving a latency associated with the input sensing unit; and
sensing a sample time associated with the input sensing unit.

19. The method of claim 17, wherein the predicted input to be provided at time $t_2$ accounts for latency associated with the input device.

20. The method of claim 17, wherein the first type is a different type than the second type.

* * * * *